United States Patent
Hitt et al.

(10) Patent No.: US 7,288,047 B1
(45) Date of Patent: Oct. 30, 2007

(54) ENGINE AND TRANSMISSION CONTROL SYSTEM AND METHOD FOR A MOTORIZED VEHICLE

(75) Inventors: Brian J. Hitt, Forest Lake, MN (US); Scot A Taylor, Forest Lake, MN (US); Craig R Vander Ploeg, Roseville, MN (US); Chad B Johnson, Ham Lake, MN (US)

(73) Assignee: Polaris Industries Inc., Medina, MN (US)

( * ) Notice: Subject to any disclaimer, the term of this patent is extended or adjusted under 35 U.S.C. 154(b) by 194 days.

(21) Appl. No.: 11/150,574

(22) Filed: Jun. 10, 2005

(51) Int. Cl.
*B60W 10/04* (2006.01)
(52) U.S. Cl. ...................................................... 477/107
(58) Field of Classification Search ................ 477/107, 477/108, 111
See application file for complete search history.

(56) References Cited

U.S. PATENT DOCUMENTS

| | | | |
|---|---|---|---|
| 4,546,673 A | 10/1985 | Shigmatsu et al. | |
| 5,073,157 A | 12/1991 | Herscovici | |
| 5,976,056 A | 11/1999 | Matsumoto et al. | |
| 6,017,290 A | 1/2000 | Kinoshita et al. | |
| 6,022,290 A | 2/2000 | Lyon | |
| 6,030,316 A | 2/2000 | Kadota | |
| 6,135,913 A | 10/2000 | Lyon | |
| 6,138,069 A | 10/2000 | Ellertson et al. | |
| 6,181,020 B1 * | 1/2001 | Uchida et al. ............ | 290/40 C |
| 6,449,548 B1 | 9/2002 | Jain et al. | |
| 6,553,302 B2 * | 4/2003 | Goodnight et al. ........... | 701/54 |
| 6,819,996 B2 | 11/2004 | Graves et al. | |

* cited by examiner

*Primary Examiner*—Dirk Wright
(74) *Attorney, Agent, or Firm*—Baker & Daniels LLP

(57) ABSTRACT

The present teachings generally include a control system for a vehicle. The control system includes an engine having a minimum engine speed and a maximum engine speed and a transmission having a minimum transmission output speed and a maximum transmission output speed. The control system also includes an accelerator assembly having a movable member movable within a range of motion. The range of motion is defined by a first position based on at least one of the minimum engine speed and the minimum transmission output speed and a second position based on at least one of the maximum engine speed and the maximum transmission output speed. A control module connects to the accelerator assembly. The control module adjusts the second position to be based on at least one of a reduced maximum engine speed, a reduced maximum transmission output speed and combinations thereof, wherein the range of motion of said movable member remains about constant.

40 Claims, 3 Drawing Sheets

ENGINE AND TRANSMISSION CONTROL SYSTEM AND METHOD FOR A MOTORIZED VEHICLE

CROSS-REFERENCE TO A RELATED APPLICATION

This application is related to commonly assigned U.S. patent application Ser. No. 11/150,573, filed on Jun. 10, 2005, entitled Engine and Transmission Control System and Method for a Vehicle Accessory to Taylor et al. The above disclosure is hereby incorporated by reference as if fully set forth herein.

FIELD

The present invention relates to an engine and transmission control system and method and more specifically relates to a control system and method to control an engine and a transmission speed.

BACKGROUND

Recreation and utility vehicles are becoming more popular and are being utilized for a range of tasks. In a typical recreation and utility vehicle, the operator may not have the capability to easily and consistently control a vehicle speed or an engine speed. In some instances, the operator must rely on constantly modulating a throttle to control the engine speed or the vehicle speed. Novice users, moreover, may operate the vehicle without the ability to limit vehicle speed and the engine speed. Furthermore, certain accessories may attach to the vehicle and may benefit from fixed or reduced vehicle speeds.

In some examples, it remains possible for the operator to reduce or control the vehicle speed or the engine speed manually. In other examples, a control system may control the engine speed and the transmission speed by decreasing a range of motion of a throttle assembly.

SUMMARY

The present teachings generally include a control system for a vehicle. The control system includes an engine having a minimum engine speed and a maximum engine speed and a transmission having a minimum transmission output speed and a maximum transmission output speed. The control system also includes an accelerator assembly having a movable member movable within a range of motion. The range of motion is defined by a first position based on at least one of the minimum engine speed and the minimum transmission output speed and a second position based on at least one of the maximum engine speed and the maximum transmission output speed. A control module connects to the accelerator assembly. The control module adjusts the second position to be based on at least one of a reduced maximum engine speed, a reduced maximum transmission output speed and combinations thereof, wherein the range of motion of said movable member remains about constant.

Further areas of applicability of the present teachings will become apparent from the detailed description and the claims provided hereinafter. It should be understood that the detailed description and specific examples, while indicating the various embodiments of the present teachings, are intended for purposes of illustration only and are not intended to limit the scope of the teachings.

BRIEF DESCRIPTION OF THE DRAWINGS

The present teachings will become more fully understood from the detailed description, the appended claims and the accompanying drawings, wherein:

DETAILED DESCRIPTION

The following description of the various embodiments is merely exemplary in nature and is in no way intended to limit the teachings, their application, or uses.

As used herein, the term module and/or device refers to an application specific integrated circuit (ASIC), a digital and/or analog electronic circuit, a processor (shared, dedicated or group) and memory that executes one or more software or firmware programs, a combinational logic circuit or other suitable electronic and mechanical components that provide the described functionality. Moreover, one or more modules may communicate with various sensors and/or engine components using digital or analog inputs and outputs and/or suitable communication networks, such as a J1939 based network.

Figure 1:
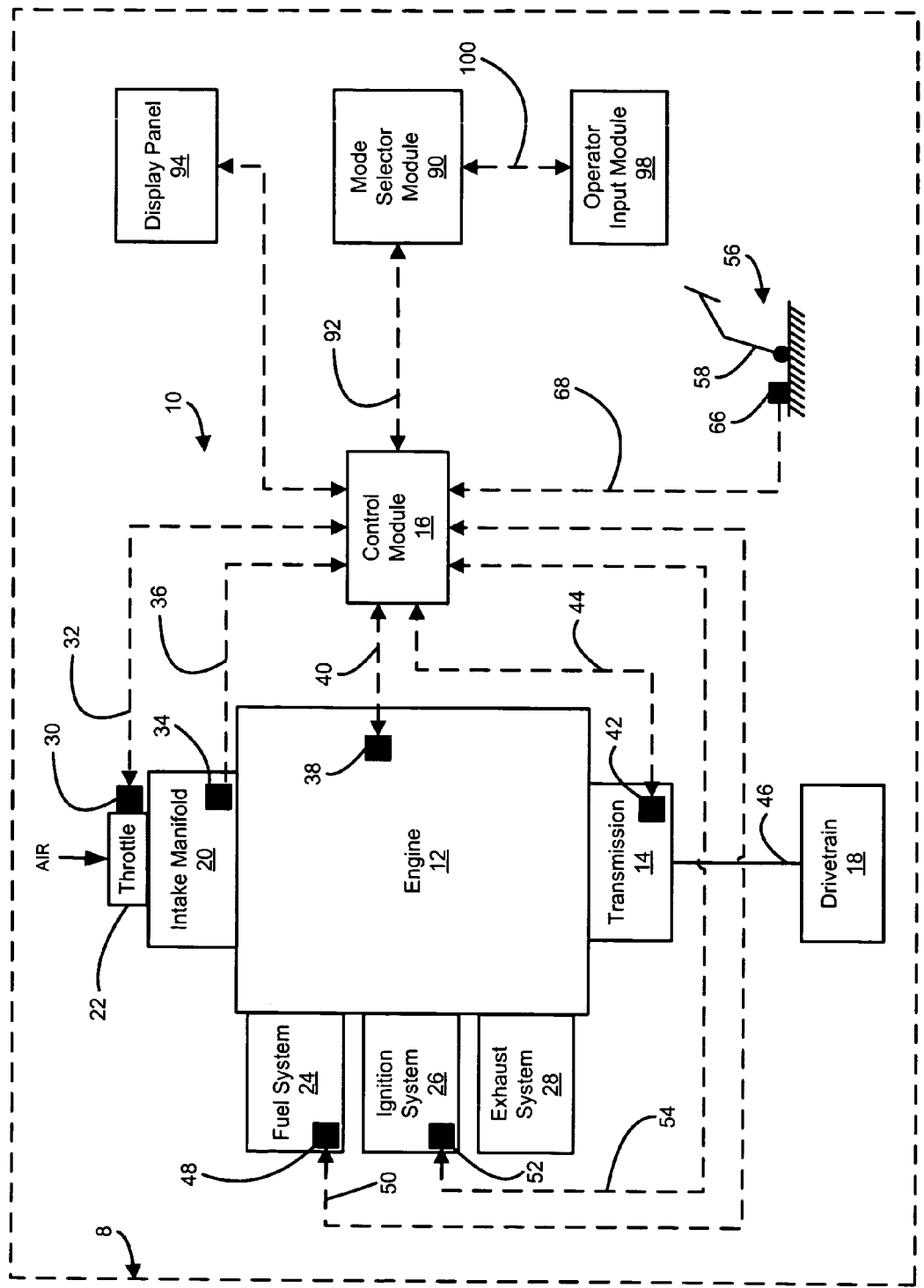
FIG. 1 is a schematic view of an engine and a transmission constructed in accordance with the present teachings.
Figure 2:
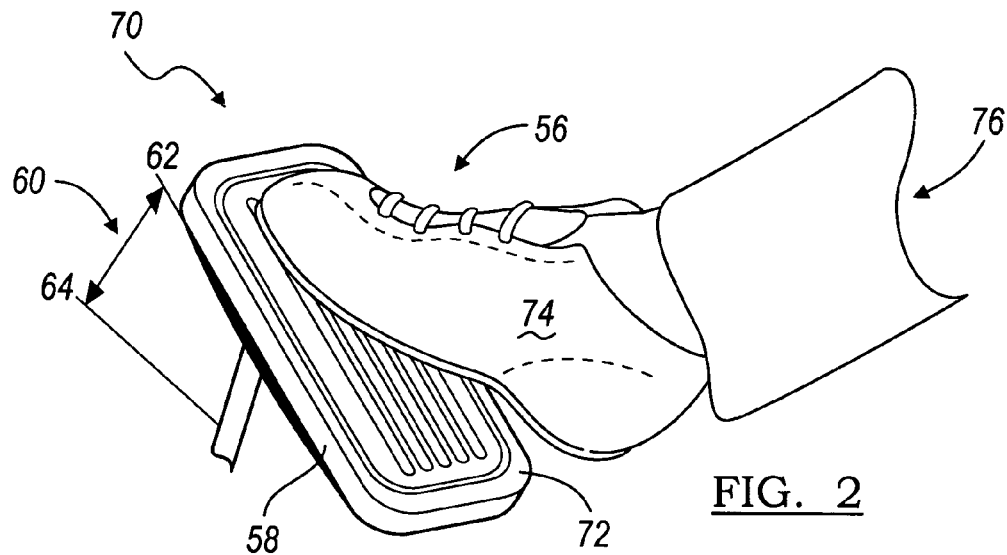
FIG. 2 is a perspective view of an accelerator assembly constructed in accordance with the present teachings showing a foot pedal assembly.

With reference to FIG. 1, a vehicle 8 includes an engine and transmission control system 10 and further includes an engine 12, which couples to a transmission 14. The engine and transmission control system 10 may be selectively engaged to control an engine speed and/or a transmission speed. Furthermore, the engine and transmission control system 10 may be selectively engaged to limit a velocity of a vehicle 8. A control module 16 communicates with the engine 12 and the transmission 14. The engine 12 and the transmission 14 may provide a torque output via a drivetrain 18 to any number of driven wheels (not shown) in a manner known in the art.

It will be appreciated that the engine and transmission control system 10 may be operable with (i.e., the drivetrain 18 may connect to) vehicles 8, which include tracks or treads (e.g., a snow mobile), vehicles 8 with two, three, four, six, etc. wheels and water craft that may be propeller or jet driven. It will also be appreciated that all or less than all of the wheels and/or treads may be connected to the drivetrain 18 (e.g., two-wheel drive in a four wheel vehicle). It will further be appreciated that while an internal combustion engine is illustrated, electric motors, internal combustion engines without throttles and other suitable torque-generating machines are operable with the various embodiments of the present teachings.

In one example, the engine 12 connects to an intake manifold 20 and a throttle 22, which may regulate airflow into the engine 12 in a manner known in the art. The engine may also connect to a fuel system 24 and an ignition system 26, which may regulate combustion and thus engine power in a manner known in the art. The fuel system 24 may include one or more fuel components, including but not limited to, fuel pumps, fuel tanks, fuel filters, fuel lines, pressure regulators, fuel injectors, carburetors and/or other suitable components and combinations thereof. The engine 12 may connect to an exhaust system 28 to suitably vent combustion gases.

In one example, the throttle 22 may have one or more throttle body sensors 30, which may communicate a throttle body signal 32 to the control module 16. In one example, the throttle body signal 32 includes a throttle body position. The intake manifold 20 may have one or more intake manifold sensors 34, which may communicate an intake manifold signal 36 to the control module 16. In one example, the intake manifold signal 36 includes a manifold pressure, which, in turn, may be used to determine an engine load. The engine 12 may include one or more engine sensors 38, which may communicate an engine sensor signal 40 to the control module 16. In one example, the engine sensor signal 40 may include the engine speed (e.g., revolutions per minute), crankshaft angular position, engine phase, engine coolant temperatures, lubrication temperatures and/or pressure levels.

The transmission 14 may have one or more transmission sensors 42, which may communicate a transmission sensor signal 44 to the control module 16. In one example, the transmission sensor signal 44 may include a transmission gear (e.g., drive, reverse, low, first, second, etc.) and/or a transmission output speed. The transmission output speed may be the rotational velocity of a transmission output shaft 46. It will be appreciated that a vehicle speed may be determined based on the transmission 14, the drivetrain 18 and/or the transmission output speed. In one example, the transmission 14 is a continuously-variable transmission. In a further example, the transmission 14 is a toroidal-type continuously-variable transmission.

The fuel system 24 may have one or more fuel system sensors 48, which may communicate a fuel system sensor signal 50 to the control module 16. In one example, the fuel system sensor signal 50 includes a fuel line pressure or fuel tank level amount. The ignition system 26 may have one or more ignition system sensors 52, which may communicate an ignition system sensor signal 54 to the control module 16. The engine and transmission control system 10 may control an engine speed, a transmission output speed and/or a vehicle speed by adjusting ignition timing (e.g., retarding or advancing the spark) in the ignition system 26, fuel delivery (e.g., leaning or enriching fuel flow) from the fuel system 24 and/or regulating airflow to the engine by altering the throttle position of the throttle 22.

The above-mentioned control of the engine speed, the transmission output speed and/or the vehicle speed may be based on respective signals from the throttle body sensor 30, the intake manifold sensor 34, the engine sensor 38, the transmission sensor 42, fuel system sensor 48, the ignition system sensor 52 and/or other suitable signals from the engine, the transmission and/or other vehicle components such as the exhaust system. While the engine and the transmission control system 10 may control the aforementioned vehicle parameters (i.e., engine speed, transmission output speed and/or vehicle speed), the control system 10 may be configured to control other engine, transmission and/or vehicle parameters, for example but not limited to wheel speed, track speed, manifold pressure, engine power, transmission output torque, etc.

In one example and with reference to FIGS. 1-4, an accelerator control assembly 56 includes a movable member 58 that is movable within a range of motion 60. The range of motion 60 may be defined by a first position 62 and a second position 64. The accelerator control assembly 56 may have an accelerator sensor 66, which may communicate an accelerator sensor signal 68 to the control module 16. The accelerator sensor signal 68 may communicate to the control module 16 a position of the movable member 58. In one example and with reference to FIG. 2, the accelerator control assembly 56 includes a foot pedal assembly 70. The foot pedal assembly 70 includes a foot pedal 72, which, for example, may be moved through the range of motion 60 by a foot 74 of a user 76.

Figure 3:
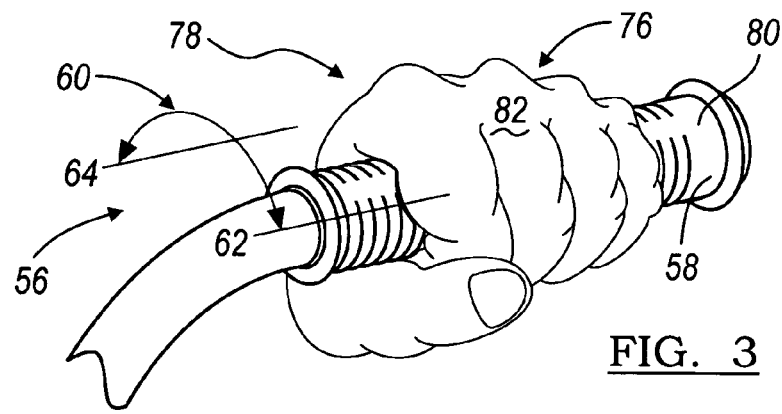
FIG. 3 is a perspective view of an alternative accelerator assembly constructed in accordance with the present teachings showing a twist-grip assembly.
Figure 4:
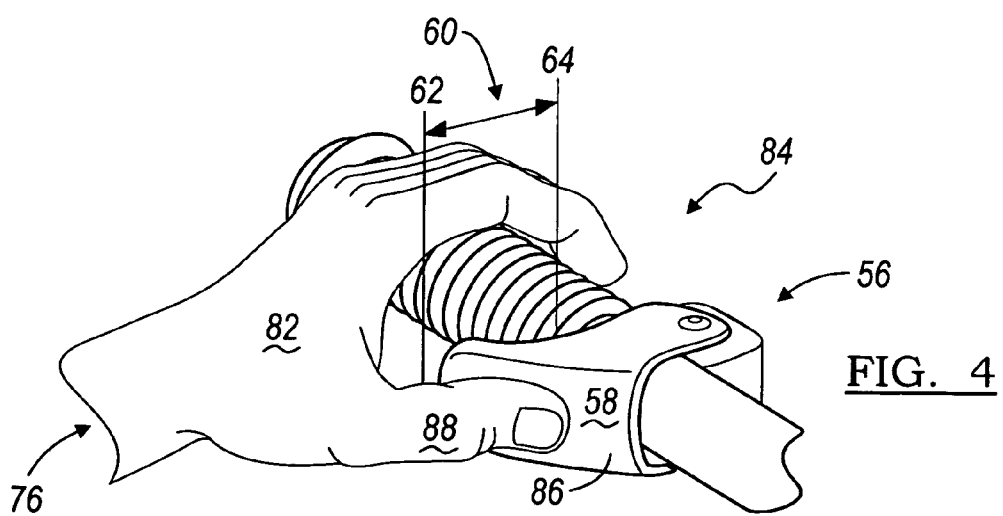
FIG. 4 is a perspective view of an alternative accelerator assembly constructed in accordance with the present teachings showing a thumb throttle assembly.

In another example and with reference to FIG. 3, the accelerator control assembly 56 includes a twist-grip assembly 78. The twist-grip assembly 78 includes a twist-grip 80, which, for example, may be moved through the range of motion 60 by a hand 82 of the user 76. In a further example and with reference to FIG. 4, the accelerator control assembly 56 includes a thumb assembly 84. The thumb assembly 84 may include a thumb throttle 86, which, for example, may be moved through the range of motion 60 by a thumb 88 of the user 76. It will be appreciated that various suitable accelerator control assemblies 56 may be used, for example a pull-knob, a lever, push-buttons, a joystick, slide-switches combinations thereof and other suitable mechanisms.

Figure 5A:
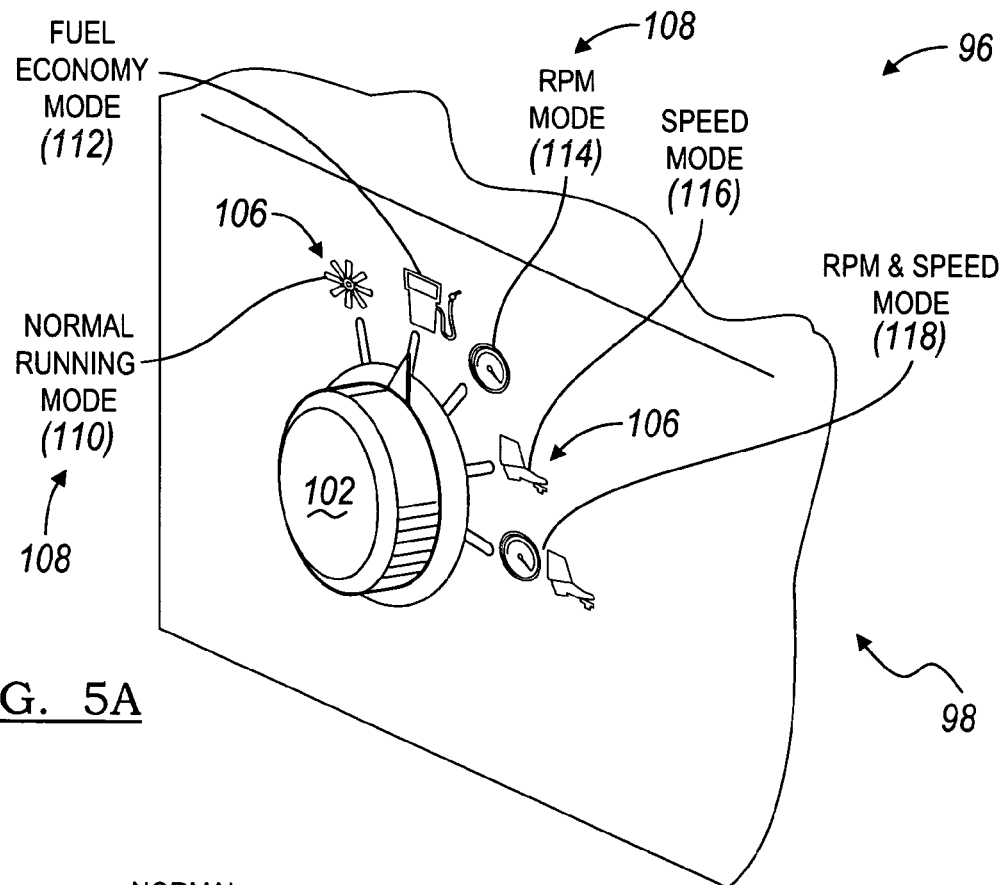
FIG. 5A is a partial perspective view of an operator input module constructed in accordance with the present teachings showing a mode selector dial.
Figure 5B:
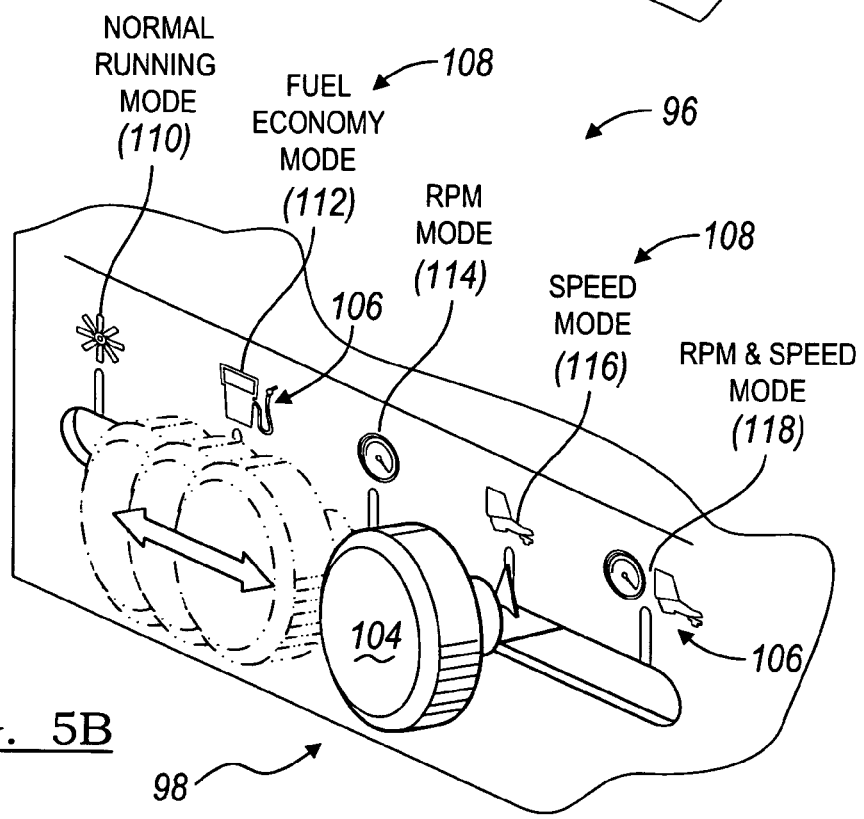
FIG. 5B is similar to FIG. 5A and shows an alternative operator input module including a mode selector knob.

In one example and with reference to FIGS. 1, 5A and 5B, a mode selector module 90 communicates a mode selection signal 92 to the control module 16. The control module 16 may communicate with a display panel 94 to indicate, for example, certain vehicle parameters and/or conditions of the engine and transmission control system 10. The display panel 94 may also display a certain mode 96 to which the mode selector module 90 has been selected. In one example, the mode selector module 90 is selectable between a plurality of engine and/or transmission modes 96. In another example, the mode selector module 90 is selectable between five modes 96.

In one example, an operator input module 98 may communicate an operator input signal 100, which may include a selected mode 96, to the mode selector module 90. In one example and with reference to FIG. 5A, the operator input module 98 may include an input dial 102, which may be rotated to selectively activate one of the plurality of engine and/or transmission modes 96. In another example and with reference to FIG. 5B, the operator input module 98 may include a selector knob 104, which may be selectively moved (i.e., translated about horizontally as illustrated in FIG. 5B) between each of the plurality of modes 96. With reference to FIGS. 5A and 5B, it will be appreciated that the modes 96 may be represented on the operator input module 98 graphically 106 and/or with textual descriptions 108. It will also be appreciated that other operator inputs may be used to communicate the modes 96 to the mode selector module 90 such as a computer interface, push-buttons, a radio-control system and/or other suitable systems.

By way of the above examples and with reference to FIGS. 1-5B, a normal running mode 110 may be selected using the operator input module 98. In the normal running mode 110, a position of the throttle 22 may be directly proportional to a position of the movable member 58 of the accelerator control assembly 56. More specifically, the user 76 may move the movable member 58 through the range of motion 60 defined by the first position 62 and the second position 64. As the movable member 58 is moved, the accelerator sensor 66 communicates the position of the movable member 58 to the control module 16. The control module 16 communicates with the throttle body sensor 30 to adjust the throttle 22 to a fixed position reflexive of the movable member 58.

The range of motion 60 of the movable member 58 and the range of motion (not shown) of the throttle body may be proportional to a range of engine speeds defined by a minimum engine speed and a maximum engine speed and a range of transmission speeds defined by a minimum transmission speed and a maximum transmission speed. In the normal running mode 110, therefore, the user 76 may adjust the accelerator control assembly 56 to accelerate the vehicle 8 up to its maximum engine speed and/or maximum transmission speed (i.e., a maximum vehicle speed). It will be appreciated that the present teachings remain operable with an engine that lacks a throttle (e.g., a diesel engine) as other applicable engine controls, such as a fuel control, may be adjusted. By way of the above examples and without regard to the type of engine used, the normal running mode 110 permits the engine and transmission control system 10 to operate the vehicle 8 in a normal fashion such that the range of motion 60 of the movable member 58 correlates generally with a minimum and a maximum vehicle speed.

In one example, the mode selector module 90 may be selected to a fuel economy mode 112 using the operator input module 98. The fuel economy mode 112 may limit the engine speed, the transmission speed and/or the vehicle speed. In one example, the fuel economy mode 112 may limit engine speed to a reduced maximum engine speed and/or may limit the transmission output speed to a reduced maximum transmission output speed. It will be appreciated that the reduced maximum vehicle speed is based on the reduced maximum engine speed and/or the reduced maximum transmission output speed. In one example, a fuel savings may be realized by limiting engine, transmission output and/or vehicle speeds to the above-mentioned reduced maximum engine transmission output and vehicle speeds. In the fuel economy mode 112, the user 76 may move the movable member 58 through the same range of motion 60 defined by the first position 62 and the second position 64. In the fuel economy mode 112, however, the second position 64 corresponds to the reduced maximum engine speed, the reduced maximum transmission speed and/or the reduced maximum vehicle speed relative to the normal running mode 110. In one example the fuel economy mode 112 may limit the engine acceleration, may limit the transmission output acceleration and/or vehicle acceleration. The user 76 may move the movable member 58 through the same range of motion 60 defined by the first position 62 and the second position 64. The fuel economy mode 112 adjusts the position of the throttle 22 to limit acceleration of the engine, transmission output speed and/or vehicle speed.

In one example, the fuel economy mode 112 limits the engine speed, the transmission output speed and/or the vehicle speed to certain predetermined values that may maximize fuel economy based on, for example, specific vehicle models. In another example, an engine map (not shown but known in the art), which may include ignition data based on engine load and ambient conditions, may be altered for the reduced maximum engine speed, the reduced maximum transmission speed and/or the reduced maximum vehicle speed set by the fuel economy mode 112. In one example, a more specific engine map tailored for range of engine, transmission output and/or vehicle speeds now defined by the applicable reduced maximum engine transmission output and/or vehicle speeds, may provide reduced fuel consumption relative to the normal running mode 110.

In one example, the mode selector module 90 may be selected to an RPM mode 114 using the operator input module 98. In the RPM mode 114, the movable member 58 may be moved by the user 76 through the range of motion 60 defined by the first position 62 and the second position 64. In the RPM mode 114, however, the second position 64 correlates to the reduced maximum engine speed. In one example, the reduced maximum engine speed may be a predetermined constant, which may be, for example, stored in the mode selector module 90. In another example, the reduced maximum engine speed may be set by user 76 through the operator input module. By way of the above example, the operator input module 98 may include various suitable speed input methods such as, but not limited to, thumb-wheels, knobs, computer-interface and/or push buttons.

In one example, the control module 16, when the mode selector module 90 is in the RPM mode 114, may hold the engine speed at a predetermined rotational speed. By way of the above example, the RPM mode 114 may hold the movable member 58 in a position based on the predetermined engine rotational speed. The RPM mode 114 may also hold the engine at the predetermined engine rotational speed independent of the position of the movable member 58. In one example, the user 76 may manually adjust the rotational speed of the engine 12 (i.e. increase engine speed with the throttle) and set that speed as the reduced maximum engine speed. In another example, the mode selector module 90 may include certain preset engine speeds and/or ranges that the user 76 may select to set the reduced maximum engine speed.

In one example, the mode selector module may be selected to a speed mode 116 using the operator input module 98. In the speed mode 116, the user 76 may move the movable member 58 through the range of motion 60 defined by the first position 62 and the second position 64. In the speed mode 116, however, the second position 64 correlates to a reduced maximum vehicle speed thus a reduced maximum transmission output speed. In one example, the vehicle speed is determined by the signal from the transmission sensor 42, which may detect the rotational velocity of the transmission output shaft 46.

In one example, the control module 16, when the mode selector module 90 is in the speed mode 116, may hold the vehicle speed at a predetermined velocity. By way of the above example, the speed mode 116 may hold the movable member 58 in a position based on the predetermined vehicle speed. The speed mode 116 may also hold the vehicle 8 at the predetermined vehicle speed independent of the position of the movable member 58. In one example, the reduced maximum vehicle speed may be a predetermined constant, which may be, for example, stored in the mode selector module 90. In another example, the reduced maximum vehicle speed may be set by user 76 through the operator input module 98. By way of the above example, the operator input module 98 may include various suitable vehicle speed input methods such as, but not limited to, thumb-wheels, knobs, computer-interface and/or push buttons. In one example, the user 76 may manually adjust the vehicle speed (i.e. increase the vehicle speed with the throttle) and set that speed as the reduced maximum vehicle speed. By way of the above example, the user 76 may set the reduced maximum vehicle speed and/or reduced maximum transmission speed in-situ, rather than rely on prior settings. In another example, the mode selector module 90 may include certain preset vehicle speeds and/or ranges that the user 76 may select to set the reduced maximum vehicle speed.

In one example, the mode selector module may be selected to an RPM and speed mode 118 using the operator input module 98. In the RPM and speed mode 118, the user 76 may move the movable member 58 through the range of motion 60 defined by the first position 62 and the second position 64. In the RPM and speed mode 118, however, the second position 64 correlates with a reduced maximum or fixed engine speed and a reduced maximum or fixed transmission speed.

It will be appreciated that the range of motion 60 for the movable member 58 in any of the above modes 110, 112, 114, 116, 118 is about equal across the aforementioned modes. While various embodiments may utilize certain accelerator control assemblies 56, the range of motion 60 of each accelerator control assembly 56 (e.g., the foot pedal assembly 70 versus the twist-grip assembly 78) is about constant throughout the above-mentioned modes. By way of the above examples, the control module 16 may hold (i.e., fix and not limit) engine speed and/or transmission output speed. As such, the maintained range of motion 60 across the aforementioned modes may not be applicable.

In one example, the mode 96 may be displayed on the display panel 94 to alert the user 76 as to what mode 96 the operator input module 98 has been selected. In another example, the reduced maximum or fixed engine speed and/or the reduced maximum or fixed transmission output speed may also be indicated on the display panel 94 to alert the user 76. In a further example, the choice of modes 110, 112, 114, 116, 118 may be locked so the user 76 may not readily change the mode 96 during operation of the vehicle 8. By way of the above example, a key and/or pass code feature may be used to lock the mode from changing.

Those skilled in the art may now appreciate from the foregoing description that the broad teachings may be implemented in a variety of forms. While the present teachings have been described in connection with particular examples thereof, the true scope of the teachings should not be so limited because other modifications will become apparent to the practitioner upon a study of the drawings, the specification and the following claims.

What is claimed is:

1. A control system comprising:
 an engine having a minimum engine speed and a maximum engine speed;
 a transmission having a minimum transmission output speed and a maximum transmission output speed;
 an accelerator assembly having a movable member movable within a range of motion defined by a first position based on at least one of said minimum engine speed and said minimum transmission output speed and a second position based on at least one of said maximum engine speed and said maximum transmission output speed; and
 a control module that is connected to said accelerator assembly and that adjusts said second position to be based, at least in part, on at least one of a reduced maximum engine speed and a reduced maximum transmission output speed, wherein said range of motion of said movable member remains about constant.

2. The control system of claim 1 wherein said reduced maximum engine speed is based, at least in part, on at least one of a reduced engine speed constant, a reduced engine speed range, a user input value, and an in-situ selected value.

3. The control system of claim 1 wherein said reduced maximum transmission output speed is based, at least in part, on at least one of a reduced transmission output speed constant, a reduced transmission output speed range, a user input value, and an in-situ selected value.

4. The control system of claim 1 wherein a reduced maximum vehicle speed is based, at least in part, on at least one of a reduced maximum engine speed and a reduced maximum transmission speed.

5. The control system of claim 1 wherein said control module adjusts said accelerator assembly to hold said movable member in a position associated, at least in part, with at least one of a fixed engine speed, a fixed transmission output speed, and a fixed vehicle speed.

6. The control system of claim 1 wherein said control module maintains, at least in part, at least one of a fixed engine speed, a fixed transmission output speed, and a fixed vehicle speed independent of a position of said movable member.

7. The control system of claim 1 wherein said movable member of said accelerator assembly is, at least in part, at least one of a foot pedal, a thumb lever, a rotating grip, a pull-knob, a lever, and a joystick.

8. The control system of claim 1 wherein said transmission is a continuously-variable transmission.

9. The control system of claim 8 wherein said continuously-variable transmission is a toroidal-type continuously-variable transmission.

10. The control system of claim 1 further comprising a mode selector module that is selectable between a plurality of modes.

11. The control system of claim 10 wherein said mode selector is selectable to at least a first mode and wherein said control module in said first mode associates said second position of said movable member with, at least in part, at least one of said maximum engine speed, said maximum transmission speed, and a maximum vehicle speed.

12. The control system of claim 11 wherein said mode selector is selectable to at least a second mode, wherein said control module in said second mode associates said second position of said movable member with, at least in part, at least one of said reduced maximum engine speed, said reduced maximum transmission speed, a reduced maximum vehicle speed, a reduced engine acceleration, a reduced transmission acceleration, and a reduced vehicle acceleration and increases a fuel efficiency of said engine relative to said first mode by adjusting, at least in part, said at least one of said reduced maximum engine speed, said reduced maximum transmission speed, said reduced maximum vehicle speed, said reduced engine acceleration, said reduced transmission acceleration, and said reduced vehicle acceleration.

13. The control system of claim 12 wherein said control module increases said fuel efficiency by adjusting an engine map based, at least in part, on said at least one of said reduced maximum engine speed, said reduced maximum transmission speed, said reduced maximum vehicle speed, said reduced engine acceleration, said reduced transmission acceleration, and said reduced vehicle acceleration.

14. The control system of claim 10 wherein said mode selector is selectable to at least a mode and wherein said control module in said mode associates said second position of said movable member with said reduced maximum engine speed or holds the engine speed constant generally about a predetermined value.

15. The control system of claim 10 wherein said mode selector is selectable to at least a mode and wherein said control module in said mode associates said second position of said movable member with said reduced maximum transmission output speed or holds the transmission output speed constant generally about a predetermined value.

16. The control system of claim 10 wherein said mode selector is selectable to at least a mode and wherein said control module in said mode associates said second position of said movable member with at least two of said reduced maximum engine speed, a fixed engine speed, said reduced maximum transmission output speed, and a fixed transmission output speed.

17. An engine and a transmission control system comprising:
an accelerator module having a movable member, said movable member having a range of motion defined by a first position, a second position and a plurality of positions therebetween;
a mode selector module selectable between at least a first mode and a second mode; and
a control module in said first mode that associates said first position with a first value of a vehicle parameter and said second position with a second value of said vehicle parameter and said control module in said second mode associates said second position with a third value of said vehicle parameter, wherein said first value is about less than said second value and wherein said third value is about less than said second value and about greater than said first value.

18. The control system of claim 17 wherein said vehicle parameter is based at least in part on at least one of an engine speed, a transmission output speed, and a vehicle speed.

19. The control system of claim 17 wherein said control module in said second mode increases a fuel efficiency of the engine relative to said first mode.

20. An engine and a transmission having an engine and a transmission control system comprising:
a mode selector module having at least a first mode, a second mode and a third mode, said mode selector module in said first mode controls an engine speed, said mode selector module in said second mode controls a vehicle speed and said mode selector module in said third mode controls said engine speed and said vehicle speed.

21. The control system of claim 20 wherein said mode selector module in said first mode holds said engine speed to about a predetermined engine speed.

22. The control system of claim 20 wherein said mode selector module in said second mode holds said vehicle speed to about a predetermined vehicle speed.

23. The control system of claim 20 wherein said mode selector module in said second mode controls a transmission output speed.

24. The control system of claim 23 wherein said mode selector module in said second mode holds said transmission output speed to about a predetermined transmission output speed.

25. The control system of claim 20 wherein said mode selector module in said third mode holds said vehicle speed and said engine speed to about a predetermined vehicle speed and a predetermined engine speed.

26. A method for controlling an engine and a transmission comprising:
providing an accelerator assembly having an accelerator member movable within a first range of motion;
determining a mode;
adjusting, at least in part, at least one of an engine speed, a transmission output speed, and a vehicle speed based on said determining said mode; and
determining a second range of motion based on said adjusting, at least in part, at least one of said engine speed, said transmission output speed, and said vehicle speed, wherein said first range of motion and said second range of motion are about equal.

27. The method of claim 26 wherein said adjusting, at least in part, at least one of said engine speed, said transmission output speed, and said vehicle speed includes, at least in part, at least one of limiting said engine speed to a reduced engine speed, which is less than a maximum engine speed and holding said engine speed generally about a predetermined engine speed.

28. The method of claim 26 wherein said adjusting, at least in part, at least one of said engine speed, said transmission output speed, and said vehicle speed includes, at least in part, at least one of limiting said vehicle speed to a reduced vehicle speed, which is less than a maximum vehicle speed and holding said vehicle speed generally about a predetermined vehicle speed.

29. The method of claim 26 wherein said adjusting, at least in part, at least one of said engine speed, said transmission output speed, and said vehicle speed includes, at least in part, at least one of limiting said transmission output speed to a reduced transmission output speed, which is less than a maximum transmission output speed and holding said transmission output speed generally about a predetermined transmission output speed.

30. The method of claim 26 wherein said adjusting, at least in part, at least one of said engine speed, said transmission output speed, and said vehicle speed includes, at least in part, limiting said vehicle speed to a reduced vehicle speed, which is less than a maximum vehicle speed and limiting said engine speed to a reduced engine speed, which is less than a maximum engine speed.

31. The method of claim 26 further comprising adjusting an engine timing map based on said adjusting, at least in part, at least one of said engine speed, said transmission output speed, and said vehicle speed.

32. A control system comprising:
at least a first vehicle parameter having a first range defined by a minimum value and a maximum value, said first vehicle parameter having a second range defined by said minimum value and a reduced value, wherein said first range is larger than said second range;
an input device having a range of motion defined by a first position and a second position; and
a mode selector module having at least a first mode and a second mode, said mode selector module in said first mode defining said range of motion based on said first range and said mode selector module in said second mode defining said range of motion based on said second range, wherein said range of motion remains about constant.

33. The control system of claim 32 wherein said input device includes an accelerator assembly having a movable accelerator member.

34. The control system of claim 33 wherein said accelerator member of said accelerator assembly is, at least in part, at least one of a foot pedal, a thumb lever, a rotating grip, a pull-knob, a lever, and a joystick.

35. The control system of claim 32 wherein said vehicle parameter is an engine speed, and wherein said minimum value is a minimum engine speed, said maximum value is a maximum engine speed and a reduced value is a reduced engine speed relative to said maximum engine speed.

36. The control system of claim 32 wherein said vehicle parameter is a vehicle speed, and wherein said minimum value is a minimum vehicle speed, said maximum value is a maximum vehicle speed and a reduced value is a reduced vehicle speed relative to said maximum vehicle speed.

37. The control system of claim 32 wherein said vehicle parameter is a transmission output speed, and wherein said minimum value is a minimum transmission output speed, said maximum value is a maximum transmission output speed and a reduced value is a reduced transmission output speed relative to said maximum transmission output speed.

38. The control system of claim 32 further comprising a second vehicle parameter having a first range defined by a minimum value and a maximum value, said second vehicle parameter having a second range defined by said minimum value and a reduced value, wherein said first range of said second vehicle parameter is larger than said second range of said second vehicle parameter.

39. The control system of claim 38 wherein said first vehicle parameter is an engine speed and said second vehicle parameter is a vehicle speed, and wherein said minimum value of said first range is a minimum engine speed, said maximum value of said first range is a maximum engine speed and a reduced value of said first range is a reduced engine speed relative to said maximum engine speed, said minimum value of said second range is a minimum vehicle speed, said maximum value of said second range is a maximum vehicle speed and a reduced value of said second range is a reduced vehicle speed relative to said maximum vehicle speed.

40. The control system of claim 38 wherein said first vehicle parameter is an engine speed and said second vehicle parameter is a transmission output speed, and wherein said minimum value of said first range is a minimum engine speed, said maximum value of said first range is a maximum engine speed and a reduced value of said first range is a reduced engine speed relative to said maximum engine speed, said minimum value of said second range is a minimum transmission output speed, said maximum value of said second range is a maximum transmission output speed and a reduced value of said second range is a reduced transmission output speed relative to said maximum transmission output speed.

* * * * *